(12) United States Patent
Medapalli et al.

(10) Patent No.: US 8,787,381 B2
(45) Date of Patent: Jul. 22, 2014

(54) QUALITY OF SERVICE, BATTERY LIFETIME, AND LATENCY IN WIRELESS COMMUNICATION DEVICES

(75) Inventors: Kamesh Medapalli, San Jose, CA (US); Nelson Sollenberger, Farmingdale, NJ (US); Conrad Smith, San Diego, CA (US); Karl Paulsen, Park City, UT (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 14 days.

(21) Appl. No.: 13/478,955

(22) Filed: May 23, 2012

(65) Prior Publication Data

US 2012/0314650 A1 Dec. 13, 2012

Related U.S. Application Data

(60) Provisional application No. 61/494,838, filed on Jun. 8, 2011.

(51) Int. Cl.
*H04L 12/28* (2006.01)

(52) U.S. Cl.
USPC ........................................................ 370/392

(58) Field of Classification Search
USPC .............. 370/252, 310, 310.2, 315, 328, 338, 370/389, 392, 471, 473, 474, 475
See application file for complete search history.

(56) References Cited

U.S. PATENT DOCUMENTS

| | | | |
|---|---|---|---|
| 7,933,263 B1 | 4/2011 | Huang | |
| 7,969,982 B2 * | 6/2011 | Harend et al. | 370/392 |
| 8,289,958 B1 * | 10/2012 | Narayanan | 370/389 |
| 2006/0227785 A1 | 10/2006 | Cournut et al. | |
| 2008/0224685 A1 * | 9/2008 | Dor et al. | 323/318 |
| 2010/0014459 A1 | 1/2010 | Mir et al. | |
| 2010/0189064 A1 * | 7/2010 | Raveendran | 370/329 |
| 2011/0013513 A1 * | 1/2011 | Lai et al. | 370/235 |

FOREIGN PATENT DOCUMENTS

WO    WO 2012/170824 A2    12/2012

OTHER PUBLICATIONS

International Search Report and Written Opinion for PCT Application No. PCT/US2012/041563, dated Sep. 14, 2012, 10 pages.
Co-pending U.S. Appl. No. 13/541,153, inventors Kong, Hongwei et al., filed Jul. 3, 2012 (Not Published).
International Preliminary Report on Patentability directed toward related International Application No. PCT/US2012/041563 mailed Apr. 3, 2014 from The International Bureau of WIPO; 6 pages.

\* cited by examiner

*Primary Examiner* — Anh Ngoc Nguyen
(74) *Attorney, Agent, or Firm* — Sterne, Kessler, Goldstein & Fox P.L.L.C.

(57) ABSTRACT

Embodiments for processing media over Internet Protocol (IP) packets in a wireless device are provided. Embodiments enable downlink and uplink media over IP flows within the wireless device that reduce the load on the application processor (AP) of the wireless device. In an embodiment, media over IP flows bypass the AP entirely allowing the AP to enter a power saving mode during media over IP sessions. This results in increased battery lifetime and reduced power consumption of the wireless device. In addition, the media over IP session quality is improved by the reduced latency resulting from bypassing the AP.

20 Claims, 7 Drawing Sheets

QUALITY OF SERVICE, BATTERY LIFETIME, AND LATENCY IN WIRELESS COMMUNICATION DEVICES

CROSS-REFERENCE TO RELATED APPLICATIONS

The present application claims the benefit of U.S. Provisional Patent Application No. 61/494,838 filed on Jun. 8, 2011, which is incorporated herein by reference in its entirety.

BACKGROUND

1. Field of the Invention

The present disclosure relates generally to processing packets in wireless communication devices.

2. Background Art

Wireless communications devices, such as smart phones, for example, today enable both data communication (e.g., Internet, email, etc.) and voice calling functionality. It is desirable that the voice calling functionality supports calls over various mobile phone technologies, including circuit-switched (e.g., Global System for Mobile Communications (GSM)) and packet-switched (e.g., Long Term Evolution (LTE), WiFi™, etc.) technologies.

Packet-switched voice calling technologies (e.g., Voice over Internet Protocol (VoIP)) place a large burden on the application processor (AP) of the wireless communications device, which both reduces the battery lifetime and increases latency within the wireless communications device.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
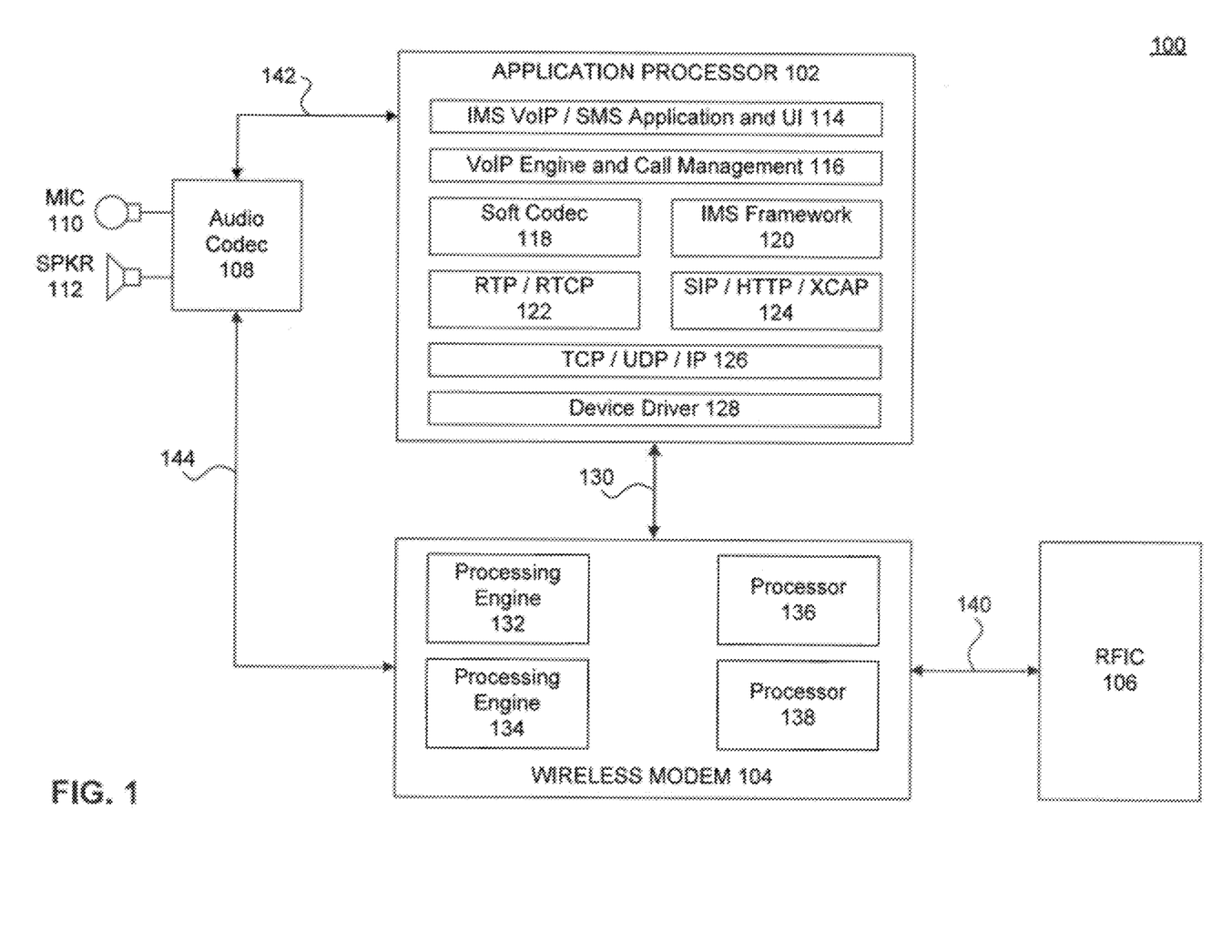
FIG. 1 illustrates an example wireless communications device according to an embodiment of the present disclosure.

FIG. 1 illustrates an example wireless communications device 100 according to an embodiment of the present disclosure. Example wireless communications device 100 is provided for the purpose of illustration and is not limiting of embodiments of the present disclosure.

Wireless communications device 100 may be a smart phone, for example, which enables data communication (e.g., Internet access, email, smart phone applications, etc.) as well as voice calling. Voice calling may include, for example, circuit-switched and/or packet-switched voice calling. Packet-switched voice calling may include Voice over Internet Protocol (VoIP) communication technologies.

Wireless communications device 100 may support various mobile phone technologies including 2G (e.g., Global System for Mobile Communications (GSM), etc.), 2.5G (e.g., General Packet Radio Service (GPRS), etc.), 3G (e.g., Enhanced Data for GSM Evolution (EDGE), Wideband Code Division Multiple Access (WDMA), CDMA2000, etc.), and 4G (e.g., Long Term Evolution (LTE), WiMAX, etc.) technologies.

As shown in FIG. 1, wireless communications device 100 includes an application processor (AP) 102, a wireless modem 104, a radio frequency integrated circuit (RFIC) module 106, an audio codec module 108, a microphone 110, and a speaker 112.

AP 102 may enable various IP-based applications, including data, audio (e.g., voice, streaming music, etc.), and/or video applications. For example, AP 102 may support a variety of IP Multimedia Subsystem (IMS)-based applications and associated user interfaces (UIs), such as VoIP/SMS Application and User Interface (UI) 114. To support these applications, AP 102 may implement an IMS framework 120. For VoIP applications, AP 102 may support a VoIP Engine and Call Management module 116, which facilitates VoIP calls by providing an interface between VoIP applications and lower level media carrier protocols. In addition, AP 102 may support a soft codec module 118 that provides compression/decompression, encryption/decryption, and other types of processing of VoIP application data.

In addition, AP 102 supports various protocol stacks, which are formed from various supported application layer protocols, transport layer protocols, and Internet layer protocols. For example, as shown in FIG. 1, AP 102 supports an "IP" stack 126, which includes the Transmission Control Protocol (TCP) and/or the User Datagram Protocol (UDP) over the Internet Protocol (IP). IP stack 126 underlies various supported application level protocols, including, for example and without limitation, the Real-time Transport Protocol (RTP) and/or the Real-time Transport Control Protocol (RTCP) 122, and the Session Initiation Protocol (SIP), the Hypertext Transfer Protocol (HTTP), and/or the XML Configuration Access Protocol (XCAP) 124.

RTP, RTCP, and SIP may be used to support VoIP applications in wireless device 100. RTP is a media carrier protocol which defines a standardized packet format for carrying media streams (e.g., audio/video) over IP networks. RTCP is a complementary control protocol to RTP, which is used to monitor transmission statistics and Quality of Service (QoS) of RTP traffic. Control information gathered by RTCP may be used by the VoIP application to control the call quality by limiting the bit rate or using a different codec, for example.

SIP is a session setup protocol which can be used to negotiate and establish a media session (e.g., RTP voice session) between two IP addresses. Typically, a RTP session is negotiated and established individually for each media (e.g., audio/video) stream. For example, separate RTP sessions are negotiated and established for the audio and video streams in a videoconference call. A negotiated RTP session includes an IP address (of the other party to the session) and a pair of transport protocol ports for RTP and RTCP traffic (which will be used by the other party in sending RTP and RTCP packets). RTP is transport protocol-independent. Thus, the transport protocol underlying RTP may be UDP or other connectionless transport protocol (e.g., Datagram Congestion Control Protocol (DCCP), Stream Control Transmission Protocol (SCTP), etc.).

AP 102 may communicate with audio codec module 108 via an interface 142. Interface 142 may be a Pulse Code Modulation (PCM)-based interface. For example, AP 102 may use interface 142 to send real-time and/or non-real-time digital audio streams to audio codec 108 for processing and playback via speaker 112, for example. AP 102 may also use interface 142 to receive digital audio streams from audio codec 108, resulting from audio captured by microphone 110. The various sent and received digital audio streams may be processed by applications supported by AP 102, including VoIP applications, for example.

AP 102 may also communicate with other external ICs of wireless communications device 100. For example, as shown in FIG. 1, AP 102 includes a device driver 128, which allows AP 102 to interface with wireless modem 104. In an embodiment, device driver 128 allows AP 102 to interface via an SDIO (Secure Digital Input Output) interface 130 with wireless modem 104. In an embodiment, AP 102 uses wireless modem 104 as a Layer 2 (L2) pipe that provides L2 functions for IP-based traffic sent and received by AP 102. L2 functions provided by wireless modem 104 may include, without limitation, data link layer functions, Medium Access Control (MAC) layer functions, and Radio Link Control (RLC) functions. In addition, AP 102 may use wireless modem 104 for baseband processing functions, including, without limitation, channel encoding/decoding, line coding/decoding, modulation/demodulation, etc. As such, wireless modem 104 acts as a bridge between AP 102 and RFIC module 106, which is responsible for physical layer RF transmission/reception of information.

Wireless modem 104 may be a mobile phone modem, which may support a variety of mobile phone technologies, including 2G (e.g., GSM, etc.), 2.5G (e.g., GPRS, etc.), 3G (EDGE, WCDMA, CMDA2000, etc.), and 4G (e.g., LTE, WiMAX, etc.). As shown in FIG. 1, wireless modem 104 includes, without limitation, a processing engine 132, a processing engine 134, a processor 136, and a processor 138. Wireless modem 104 may communicate with AP 102 via interface 130, with audio codec 108 via an interface 144 (e.g., Integrated Interchip Sound (I2S) interface), and with RFIC module 106 via an interface 140.

Processor 136 is a chip-level general controller. Processor 136 may thus perform general housekeeping functions, including boot up, configuration, and management functions. In addition, processor 136 may drive various interfaces, such as interface 130, for example, which connects wireless modem 104 to other ICs of wireless device 100.

Processor 138 implements one or more L2 protocol stacks. For example, processor 138 may support various data link layer protocols, MAC layer protocols, and RLC protocols. L2 protocols are defined by mobile phone technologies, including 3G and 4G technologies. Certain L2 protocols may be common to more than one technology. In an embodiment, processor 138 provides an L2 data pipe for AP 102 via interface 130 (and optionally through processing engine 134). In the downlink, processor 138 receives L2 traffic from processing engine 134 and relays it as IP traffic to AP 102. In the uplink, processor 138 receives IP traffic from AP 102 and relays it as L2 traffic to processing engine 134.

Processing engine 134 implements baseband processing functions, including, without limitation, channel encoding/decoding, line coding/decoding, modulation/demodulation, etc. For example, processing engine 134 may implement a variety of baseband processing functions in accordance with various mobile phone standards, including, for example and without limitation, LTE, WiMAX, EDGE, etc. In an embodiment, processing engine 134 acts as a bridge between processor 138 and RFIC module 106. Specifically, in the downlink, processing engine 134 receives baseband traffic from RFIC module 106 and relays it as L2 traffic to processor 138. In the uplink, processing engine 134 receives L2 traffic from processor 138 and relays it as baseband traffic to RFIC module 106.

Processing engine 132 implements various speech coding (data compression) functions, including, for example, narrow-band, wide-band, and adaptive multi-rate speech coding functions. Typically, these speech coding functions are defined in mobile phone technology standards. In addition, processing engine 132 may provide other acoustical processing functions, such as noise suppression, echo cancellation, etc. In embodiments, processing engine 132 may be used to process digital audio streams, received from either AP 102 or directly from audio codec 108 over interface 144.

As mentioned above, voice calling using wireless device 100 may include circuit-switched and/or packet-switched voice calling (e.g., VoIP). Circuit-switched voice calling (e.g., 2G) generally does not involve AP 102, and specifically, for example, IP stack 126, RTP/RTCP 122, and SIP 124. For example, apart from the initial call setup (to establish dedicated channels) using a signaling protocol that may run on AP 102, audio streams containing incoming/outgoing voice do not flow through AP 102. Specifically, in the uplink, audio is captured and converted into an analog audio signal by microphone 110. In audio codec 108, the analog audio signal may be amplified, filtered, and then converted to digital form to form a digital audio signal. The digital audio signal is then forwarded via interface 144 to wireless modem 104. In wireless modem 104, the digital audio signal may be acted upon by processing engine 132, processor 138, and processing engine 134, before being forwarded as uplink baseband information to RFIC module 106 for RF transmission. In the downlink, downlink baseband information is received by wireless modem 104 from RFIC module 106. The downlink baseband information may be acted upon by processing engine 134, processor 138, and processing engine 132, before being forwarded as a digital audio signal to audio codec module 108. Audio codec module 108 processes the digital audio signal and converts it to an analog audio signal for playback by speaker 112.

Packet-switched voice calls (e.g., 3G/4G) (and packet-based audio traffic (e.g., streaming music)) typically involve different flows within wireless device 100. Specifically, because packet-switched voice calls (e.g., VoIP) require packetizing voice in transport and/or Internet layer protocols, audio streams containing incoming/outgoing voice must flow through AP 102. Typically, in the uplink, audio codec 108 forwards a digital audio signal (produced from audio captured by microphone 110) to processing engine 132 of wireless modem 104. Digital processing is applied to the digital audio signal by processing engine 132 and the resulting digital audio stream is forwarded to AP 102. In AP 102, the digital audio stream is formed into RTP packets by RTP 122 and then encapsulated into UDP and then IP packets by IP stack 126, for example. Other media carrier protocols, transport protocols, and Internet layer protocols may also be used in other embodiments. The resulting VoIP packets are then forwarded back to wireless modem 104, where the VoIP packets are processed by processor 138, processing engine 134, and then sent as uplink baseband information to RFIC module 106 for RF transmission. In the downlink, downlink baseband information is received by wireless modem 104 from RFIC module 106. The downlink baseband information may be acted upon by processing engine 134 and processor 138, before being forwarded as IP packets to AP 102. In AP 102, IP, UDP, and RTP de-capsulation are performed to retrieve a digital audio stream. The digital audio stream is then either forwarded to processing engine 132 of wireless modem 104 for digital processing and then to audio codec 108 or, alternatively, acted upon by soft codec 118 of AP 102 and then sent to audio codec 108.

Because VoIP traffic flows in and out of AP 102, AP 102 must stay ON for the entirety of a VoIP call, in order to process each and every downlink and uplink voice packet. This may result in high power consumption and reduced battery lifetime of wireless device 100. In addition, the VoIP call quality (e.g., Quality of Service (QoS)) may be affected by the latency involved in routing voice packets from wireless modem 104 to AP 102, and vice versa. This is especially a concern when AP 102 is running at a high usage capacity to process other application data, for example.

In another embodiment, as described with reference to FIG. 2 below, AP 102 may be eliminated from VoIP/Internet audio streaming data traffic flows. For example, AP 102 may only be involved in the initial RTP session set up through its SIP protocol and in controlling the RTP session using its RTCP protocol. The VoIP/Internet audio data packets (which contain audio) however are routed within wireless device 100 without passing through AP 102. As such, the usage of AP 102 to support VoIP/Internet audio streaming is reduced significantly, resulting in improved QoS, increased battery lifetime, and reduced power consumption. In addition, AP 102 may be able to enter a power saving mode since it no longer needs to process every VoIP packet. The audio quality is also improved due to reduction in latency of transporting audio packets between AP 102 and wireless modem 104.

In an embodiment, this flow approach is achieved through an audio sniffer module, located either in wireless modem 104 or in another module coupled to wireless modem 104 (may be on the same chip as wireless modem 104). The audio sniffer module includes IP packet sniffing functionality to determine whether or not a downlink IP packet contains an audio frame (e.g., voice frame) that belongs to a particular audio session (e.g., VoIP, Internet audio streaming, etc.). The audio sniffer module also include packet routing functionality configured to route the IP packet to AP 102, if the IP packet does not contain an audio frame (i.e., the IP packet is a non-audio application IP packet or a control packet), and to audio codec 108, if the IP packet contains an audio frame (after media carrier protocol, transport protocol, and Internet protocol de-capsulation). The audio sniffer module also includes thin transport protocol/Internet protocol layer functions and media carrier protocol (e.g., RTP) functions, which allow wireless modem 104 to perform appropriate header processing (for downlink and uplink traffic) without resort to AP 102. In an embodiment, the audio sniffer module only requires minimal control information from AP 102, including, for example, information to identify downlink IP packets containing voice and to correctly address uplink voice containing IP packets.

In another embodiment, the audio sniffer module can use air-interface protocol mapping information to determine which radio bearers contain audio and which ones contain signaling (e.g., SIP) or non-audio to easily identify audio packets without deep packet filtering, thereby reducing the processing time and power consumption on the modem. Typically, radio bearers are assigned by the network (e.g., base station) when a radio resource is requested by a wireless device, such as device 100. When an audio session is established, a data radio bearer is assigned to the session and communicated to the device. Typically, this is done by a Radio Link Control (RLC) protocol of the data link layer (L2). In an embodiment, data bearer information is communicated to the audio sniffer module to allow the audio sniffer module to determine audio packets without IP filtering. In an embodiment, the information is communicated to the audio sniffer module whenever a data radio bearer is assigned to an audio session. The audio sniffer module may thus inspect a L2 packet to determine its assigned data bearer and thus determine if the L2 packet contains audio. Routing of the packet, subsequently, remains as described above and further described below.

Figure 2:
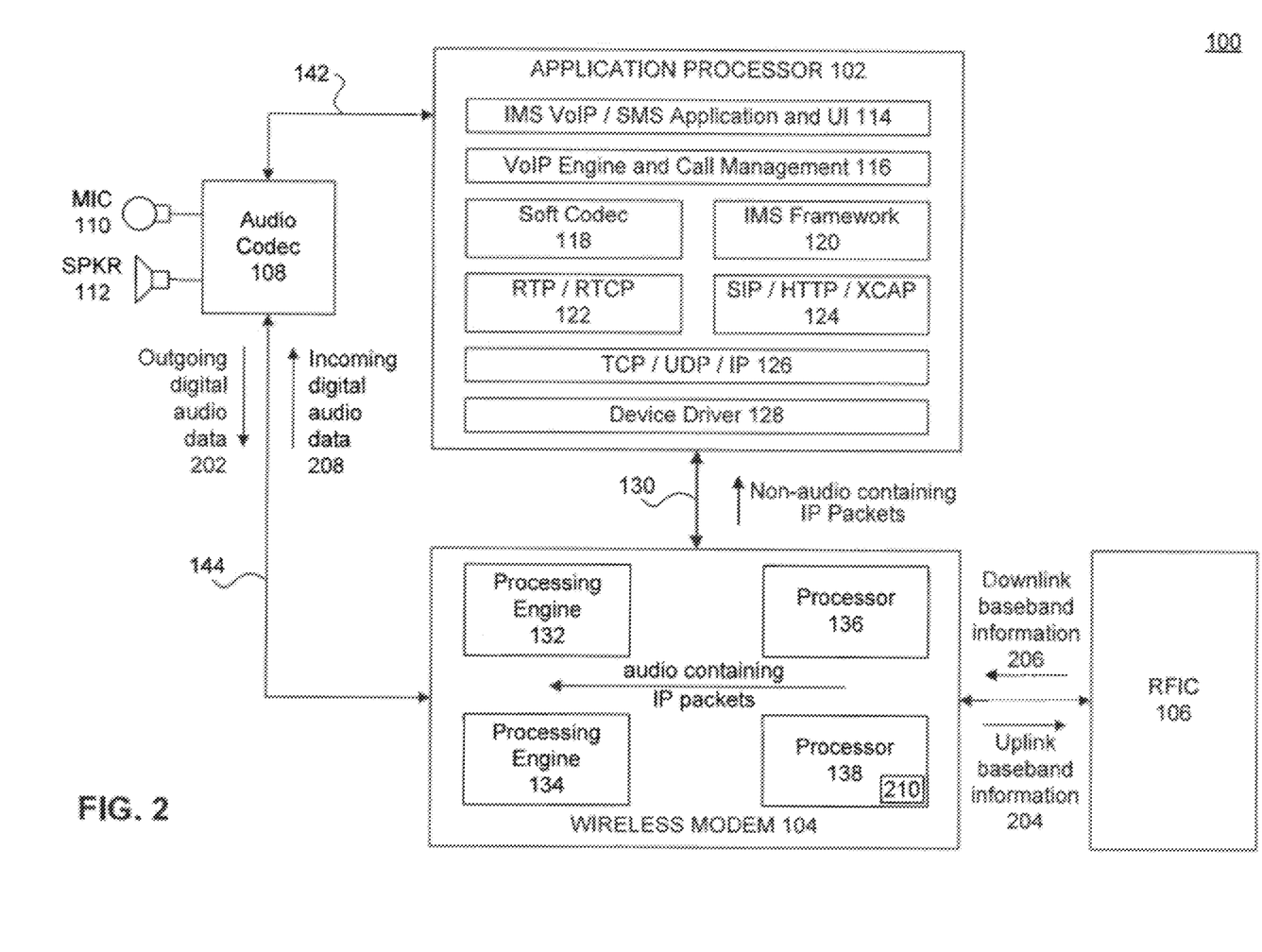
FIG. 2 illustrates internal traffic flows within an example wireless communications device according to an embodiment of the present disclosure.

FIG. 2 illustrates uplink and downlink audio traffic flows within example wireless communications device 100 according to this embodiment. For the purpose of illustration, it is assumed that an audio sniffer module 210 is implemented in wireless modem 104. For example, audio sniffer module 210 may be implemented in processor 138 and may be configured to communicate directly with the L2 protocol stack of processor 138.

In the uplink, after audio is captured by microphone 110, outgoing digital audio data 202 is generated by audio codec module 108 and forwarded to wireless modem 104. In wireless modem 104, outgoing digital audio data 202 is processed by processing engine 132 and then forwarded to processor 138. Processor 138, using audio sniffer module 210, generates RTP packets from the digital audio data and encapsulates the RTP packets into transport protocol (e.g., UDP) and then into Internet protocol (e.g., IP) packets. Subsequently, processor 138 applies L2 processing on the resulting VoIP packets and forwards the resulting L2 packets to processing engine 134. Processing engine 134, as described above, performs baseband processing functions on the L2 packets and forwards them as uplink baseband information 204 to RFIC module 106.

In the downlink, wireless modem 104 receives downlink baseband information 206 from RFIC module 106. Baseband processing by processing engine 134 and L2 processing by processor 138 result in IP packets in processor 138. Processor 138, using audio sniffer module 210, examines the resulting IP packets to determine whether or not they contain audio frames that belong to an ongoing VoIP session. If an IP packet does not contain an audio frame, processor 138 routes the IP packet to AP 102. For example, the IP packet may be a non-audio application IP packet or contain a control protocol packet (e.g., RTCP packet) destined for AP 102. Alternatively, if the IP packet contains an audio frame, processor 138, using audio sniffer module 210, performs appropriate header processing on the IP packet (e.g., IP, UDP, and RTP de-capsulation) to extract the audio frame contained in the IP packet and routes the extracted audio frame to processing engine 132, for example, and then to audio codec 108 as incoming digital audio data 208. Thus, when the IP packet contains an audio frame, AP 102 is bypassed entirely as indicated by the arrow illustrating the flow of downlink audio containing IP packets in FIG. 2.

Figure 3:
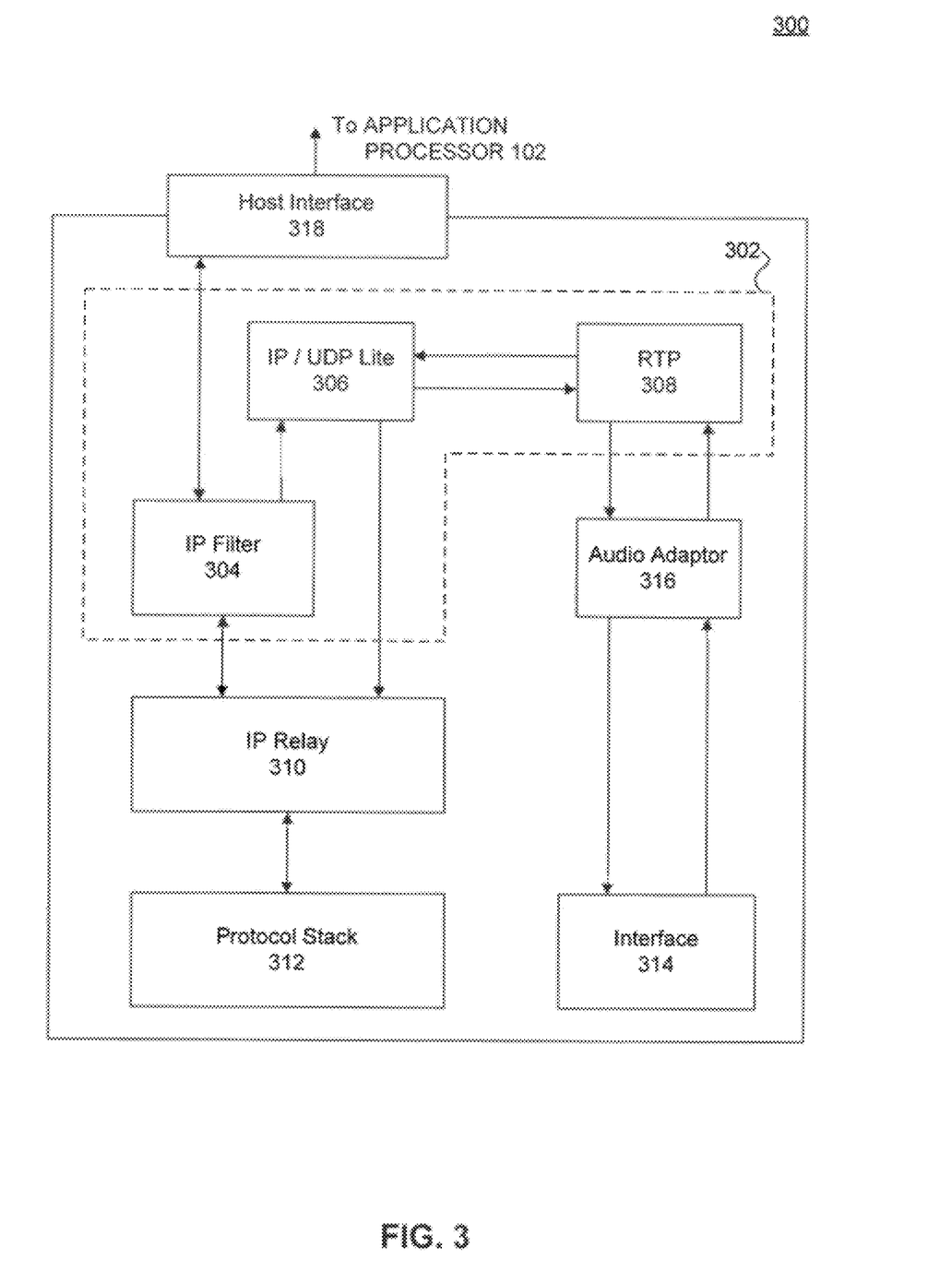
FIG. 3 illustrates an example implementation of embodiments of the present disclosure.

FIG. 3 illustrates an example implementation 300 of embodiments of the present disclosure. Example implementation 300 is provided for the purpose of illustration and is not limiting. As would be understood by a person of skill in the art based on the teachings herein, embodiments may be implemented with more or less elements than shown in FIG. 3. In embodiments, example implementation 300 may be implemented, partially or fully, within wireless modem 104 and/or another chip coupled to wireless modem 104. For example, one or more elements of example implementation 300 may be implemented in processor 138 of wireless modem 104. Other elements may be implemented outside of processor 138 within wireless modem 104 or outside of wireless modem 104.

As shown in FIG. 3, example implementation 300 includes an audio sniffer module 302, including an IP filter 304, a thin IP/transport protocol (e.g., thin IP/UDP) module 306, and a media carrier protocol (e.g., RTP) module 308; an IP relay module 310, a protocol stack 312, an interface 314, an audio adaptor 316, and a host interface (e.g., inter-process communication (IPC) interface) 318.

In operation, downlink L2 packets are received by protocol stack 312. Protocol stack 312 may include one or more L2 stacks. In an embodiment, protocol stack 312 is implemented on processor 138 of wireless modem 104. L2 packets are processed in protocol stack 312 to produce downlink IP packets. Then, the downlink IP packets are passed via IP relay module 310 to IP filter 304 of audio sniffer module 302.

In an embodiment, IP filter 304 is configured to examine downlink IP packets to determine which contain audio. In an embodiment, IP filter 304 is configured to determine (a) if a source IP address of the IP packet matches a predetermined source IP address; (b) if the first IP packet encapsulates a transport protocol packet of a defined type; and (c) when the first IP packet encapsulates the transport protocol packet of the defined type, if a destination port number of the transport protocol packet matches a predetermined transport protocol port number.

The predetermined source IP address, the defined transport protocol type, and the predetermined transport protocol port number are determined by the RTP session negotiation. As mentioned above, a negotiated RTP session includes an IP address and a pair of transport protocol ports for RTP and RTCP traffic. Accordingly, the predetermined source IP address corresponds the IP address of the host (i.e., the other party to the session) obtained by the RTP session negotiation. The defined transport protocol type is the type of transport protocol (e.g., UDP) in use for the RTP session. In an embodiment, the type of transport protocol used can be determined by examining the "Protocol" field of the IP packet, which typically includes a number that identifies the transport protocol in use for a particular datagram. The predetermined transport protocol port number is the transport protocol port number assigned to the RTP process of wireless device 102 by the RTP session negotiation. In an embodiment, IP filter 304 receives at least one of the predetermined source IP address and the predetermined transport protocol port number from the session setup (e.g., SIP) protocol executing on AP 102.

In an embodiment, IP filter 304 is configured, if the IP packet does not satisfy at least one of conditions (a), (b), and (c) described above (i.e., the IP packet is determined to include a non-audio frame), to forward the IP packet to AP 102 via host interface 318. Otherwise, if the IP packet satisfies all of conditions (a), (b), and (c) (i.e., the IP packet is determined to include an audio frame), IP filter 304 forwards the IP packet to module 306.

Module 306 is configured to process an IP header and a transport protocol header of the IP packet to extract a media carrier protocol (e.g., RTP) packet from the IP packet and to forward the media carrier protocol packet to module 308. Module 308 is configured to process the media carrier protocol packet to extract an audio frame from it and to forward the audio frame to audio adaptor 316. Audio adaptor 316 buffers audio frames, as needed, and then forwards them as digital audio samples for processing, for example by processing engine 132 of wireless modem 104, via interface 314.

In the uplink, digital audio samples are received by audio adaptor 316, for example from processing engine 132 of wireless modem 104, via processing engine interface 314. Audio adaptor 316 buffers as many digital audio samples as needed to form an audio frame, which it forwards to module 308. Module 308 encapsulates the audio frame in a media carrier protocol (e.g. RIP) packet and forward the media carrier protocol packet to module 306.

Module 306 encapsulates the media carrier protocol packet in a transport protocol packet (e.g., UDP), and then into an IP packet. In an embodiment, module 306 receives a predetermined transport protocol port number and a predetermined destination IP address from the session setup protocol (e.g., SIP) executing on AP 102. The predetermined, destination IP address and the predetermined transport protocol port number identify, respectively, the destination device and the downlink media stream at the destination device. In an embodiment, module 306 is configured to insert the predetermined transport protocol port number into the transport protocol packet and the predetermined destination IP address into the IP packet. Then, module 306 forwards the IP packet to protocol stack 312 via IP relay 310.

In another embodiment, data radio bearer information is used to route packets with IP filtering. In the downlink, data radio bearer information is used by protocol stack 312 to determine packets carrying audio (e.g., voice). Audio-carrying packets, determined from the radio bearer information, are routed directly from protocol stack 312 to RTP 308. On the uplink, RTP packets from RTP 308 are directly fed to the radio bearers at protocol stack 312. This embodiments results in latency and processing benefits as would be understood by a person of skill in the art based on the teachings herein.

Figure 4:
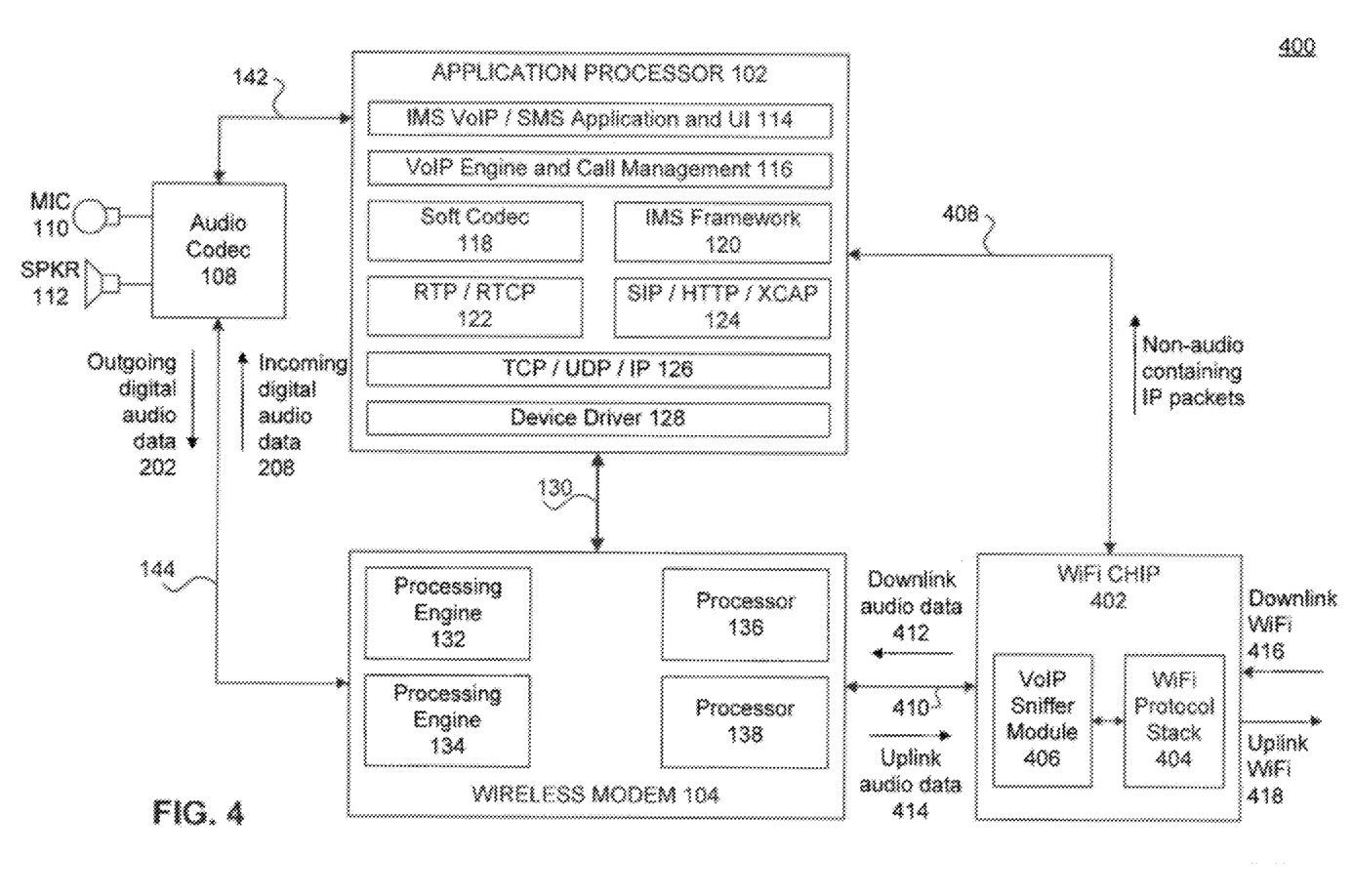
FIG. 4 illustrates another example wireless communications device according to an embodiment of the present disclosure.

In other embodiments, example implementation 300 may use a "lightweight" RTP/UDP/IP stack. The lightweight RTP/UPD/IP stack performs RTP/UDP/IP encapsulation/decapsulation. In an embodiment, the RTP/RTCP stack (e.g., RTP/RTCP 122) on the AP is used for call set up. The first few packets may be forwarded to the AP. Subsequently, RTP timestamp, sequence number, UDP header, and IP header information are passed to the lightweight RTP/UDP/IP stack from the AP. Subsequent packets containing audio are not forwarded to the AP but processed by the lightweight RTP/UDP/IP stack. FIG. 4 illustrates another example wireless communications device 400 according to an embodiment of the present disclosure. Example wireless communications device 400 is provided for the purpose of illustration and is not limiting of embodiments of the present disclosure. As shown in FIG. 4, wireless communications device 400 includes similar components as described above with respect to wireless device 100. Wireless device 400 also includes an RFIC module 106 (not shown in FIG. 4) like wireless device 100. In addition, wireless communications device 400 includes a WiFi™ chip 402.

WiFi™ chip 402 implements a WiFi™ protocol stack 404 (which performs Layer 1 (L1) and L2 WiFi™ functions) and a VoIP sniffer module 406. VoIP sniffer module 406 provides similar functionality as audio sniffer module 302 described above in FIG. 3. As such, WiFi™ chip 402 may be able to split downlink WiFi™ traffic 416 between non-audio containing IP packets, which are forwarded via an interface 408 to AP 102, and audio containing IP packets, which are processed by VoIP sniffer module 406 to generate downlink audio data 412. Downlink audio data 412 is forwarded to wireless modem 104, where it may be processed by processing engine 132 of wireless modem 104, and then forwarded as incoming digital audio data 208 to audio codec 108.

For uplink traffic, outgoing digital audio data 202 is generated and forwarded to wireless modem 104 by audio codec 108. In wireless modem 104, digital audio data 202 may be processed by processing engine 132 and then forwarded as uplink audio data 414 to WiFi™ chip 402. In WiFi™ chip 402, VoIP sniffer module 406 encapsulates the data into appropriate media carrier protocol, transport protocol, and Internet protocol packets and forwards the resulting IP packets to WiFi™ protocol stack 404. WiFi™ protocol stack 404 processes the IP packets to generate uplink WiFi traffic 418 for transmission by RFIC module 106.

Figure 5:
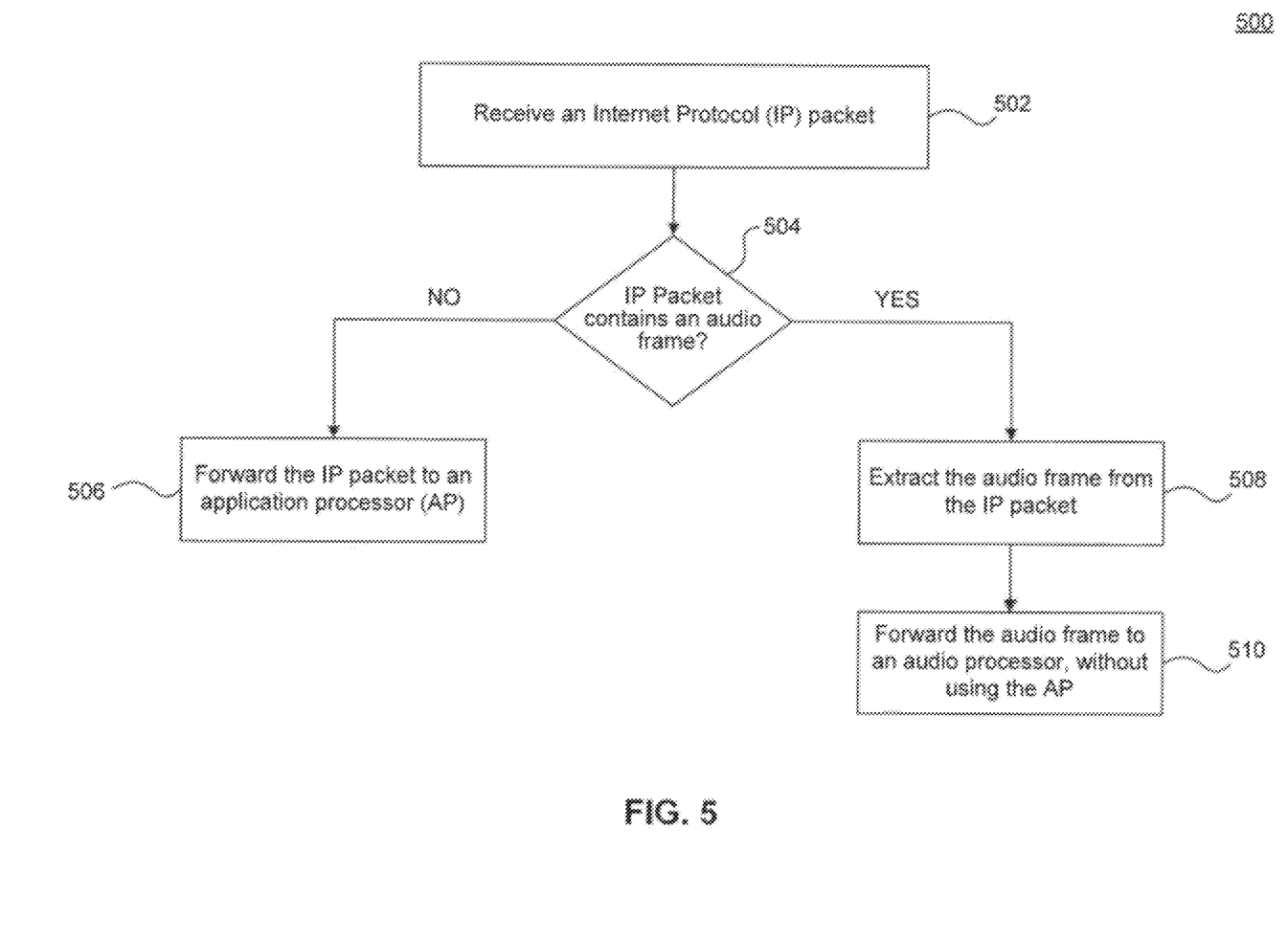
FIG. 5 is a process flowchart of a method of processing packets in a wireless communications device according to an embodiment of the present disclosure.

FIG. 5 is a process flowchart 500 of a method of processing packets in a wireless communications device according to an embodiment of the present disclosure. Process 500 may be performed within a wireless modem of the wireless communications device and/or in another module outside the wireless modem (which may be on the same chip as the wireless modem). For example, process 500 may be performed by a audio sniffer module 302 as described above in FIG. 3.

As shown in FIG. 5, process 500 begins in step 502, which includes receiving an IP packet. In an embodiment, step 502 is performed by an IP filter module (e.g., IP filter 304) configured to receive IP packets from an underlying L2 protocol stack, for example.

Subsequently, process 500 proceeds to step 504, which includes determining if the IP packet contains an audio frame for a particular audio stream. In an embodiment, the audio stream is identified by a source IP address and a transport protocol port number. In an embodiment, step 504 is performed by an IP filter module configured to process the IP and/or the transport protocol headers of the IP packet to determine if the IP packet contains an audio frame for the particular audio stream.

If the IP packet does not contain an audio frame in step 504, process 500 terminates in step 506, which includes forwarding the IP packet to an application processor (AP) of the wireless communications device. Otherwise, if the IP packet contains an audio frame, then process 500 proceeds to step 508.

Step 508 includes extracting the audio frame from the IP packet. In an embodiment, step 508 is performed by a module that implements thin IP/transport protocol functions (e.g., module 306), such as encapsulation/de-capsulation functions, and/or by a module that implements a media carrier protocol (e.g., module 308). Finally, process 500 terminates in step 510, which includes forwarding the audio frame to an audio processor, without using the AP of the wireless communications device. The audio processor may be on the wireless modem or in another module of the wireless communications device.

Figure 6:
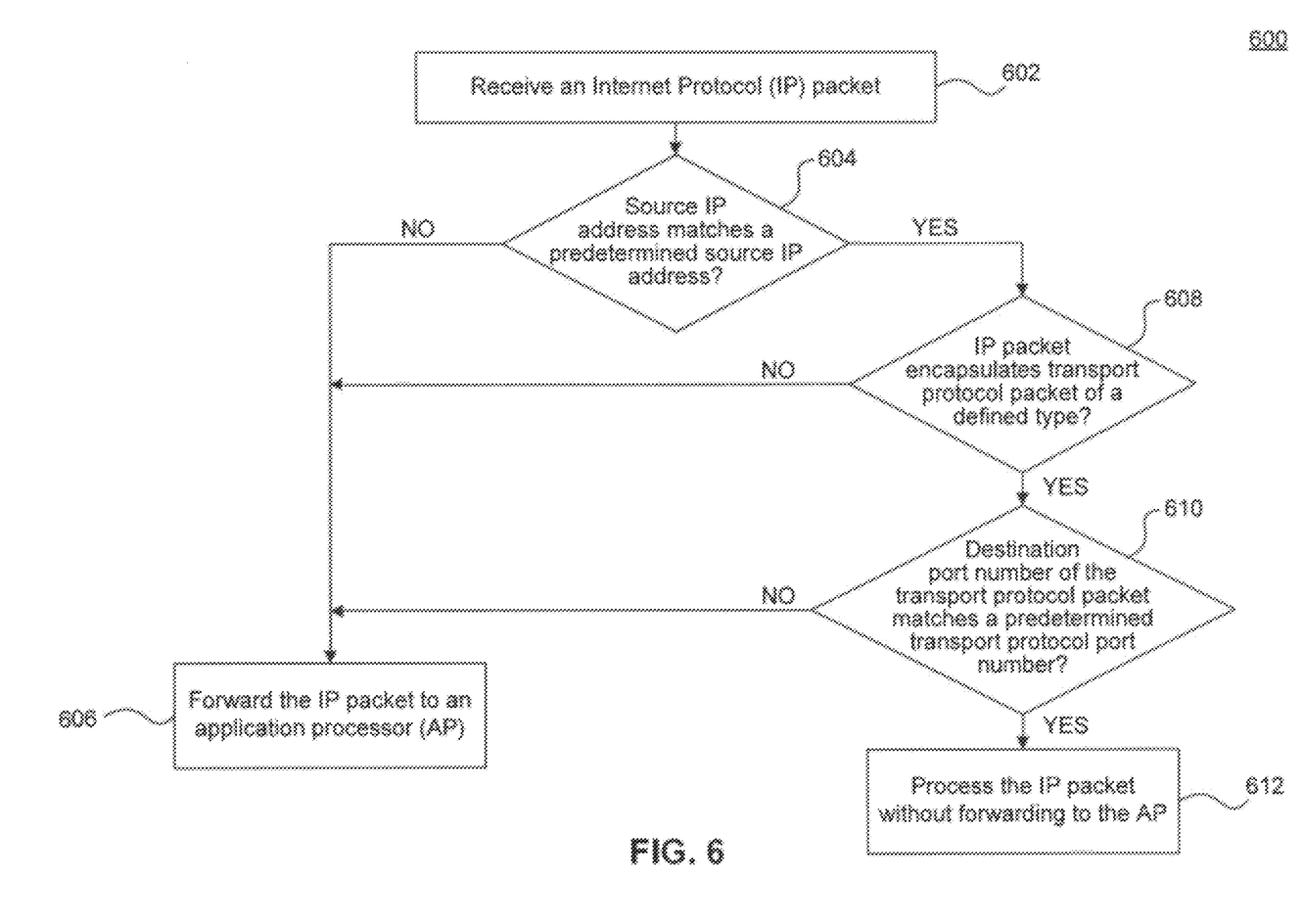
FIG. 6 is a process flowchart of a method of processing packets in a wireless communications device according to an embodiment of the present disclosure.

FIG. 6 is a process flowchart 600 of a method of processing packets in a wireless communications device according to an embodiment of the present disclosure. Process 600 may be performed within a wireless modem of the wireless communications device and/or in another module outside the wireless modem (which may be on the same chip as the wireless modem). For example, process 600 may be performed by an audio sniffer module 302 as described above in FIG. 3, and more specifically by IP filter module 304 of audio sniffer module 302 to determine if an IP packet contains an audio frame for a particular VoIP session.

As shown in FIG. 6, process 600 includes steps 602, 604, 606, 608, 610, and 612. In other embodiments, one or more of steps 604, 608, and 610 may be optional. Process 600 begins in step 602, which includes receiving an IP packet. In an embodiment, step 602 includes receiving the IP packet from an underlying L2 protocol stack, for example.

Subsequently, step 604 includes determining if a source IP address of the IP packet matches a predetermined source IP address. As mentioned above, when a media over IP (e.g., VoIP) session is setup, a negotiation protocol (e.g., SIP) is used to negotiate the session. The RTP session negotiation includes determining an IP address of the host (i.e., the other party to the session) and a pair of transport protocol (e.g., UDP) port numbers that will be used by the host to send RTP and RTCP packets to the wireless device. Thus, step 604 includes determining if the source IP address of the IP packet corresponds to the IP address of the host obtained by the RTP session negotiation. If the source IP address does not match the predetermined source IP address in step 604, process 600 terminates in step 606, which includes forwarding the IP packet to an application processor (AP) of the wireless communications device. Otherwise, process 600 proceeds to step 608.

Step 608 includes determining if the IP packet encapsulates a transport protocol packet of a defined type. In an embodiment, the RTP session negotiation includes defining a transport protocol type for the RTP session. Thus, step 608 includes determining if the IP packet encapsulates a transport protocol packet of the type defined by the RTP session negotiation. In an embodiment, step 608 includes examining the "Protocol" field of the IP packet, which includes a number that identifies the transport protocol in use for a particular datagram. If the IP packet does not encapsulate a transport protocol packet of the defined type in step 608, process 600 terminates in step 606. Otherwise, process 600 proceeds to step 610.

Step 610 includes determining if a destination port number of the transport protocol packet matches a predetermined transport protocol port number. As mentioned above, the RTP session negotiation includes determining an IP address of the host (i.e., the other party to the session) and a pair of transport protocol (e.g., UDP) port numbers that will be used by the host to send RTP and RTCP packets to the wireless device. Thus, step 610 includes determining if the destination port number of the transport protocol packet matches the transport protocol port number assigned for the RTP process of the wireless device by the RTP session negotiation.

If the destination port number of the transport protocol packet does not match the predetermined transport protocol port number in step 610, process 600 terminates in step 606. Otherwise process 600 proceeds to step 612, which includes processing the IP packet without forwarding it to the AP. This includes extracting the audio frame contained in the IP packet and forwarding the audio frame to an audio processor.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
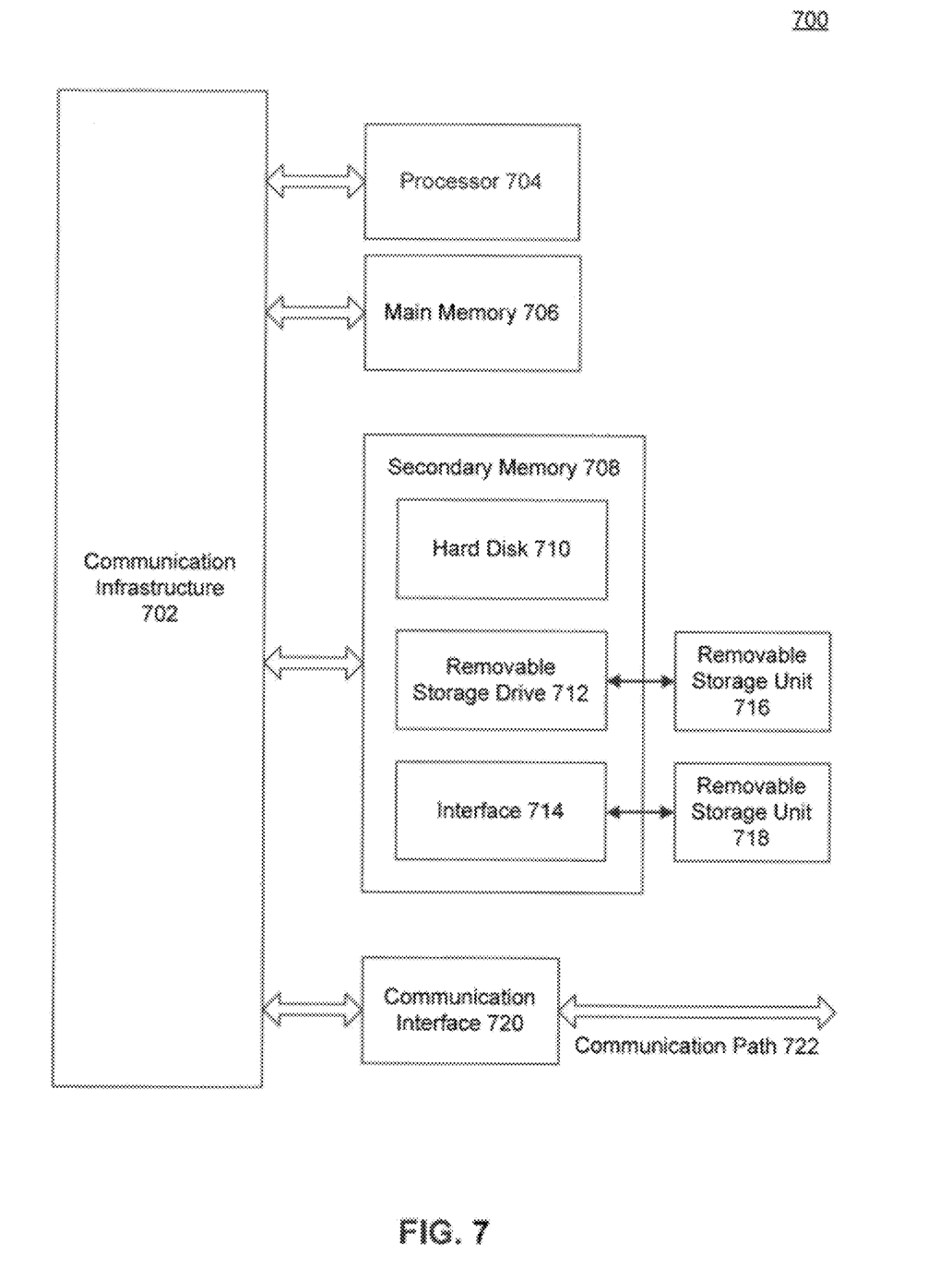
FIG. 7 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Modules depicted in FIGS. 1-4 may execute on one or more computer systems 700. Furthermore, each of the steps of the flowcharts depicted in FIGS. 5-6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

in another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A wireless communications device, comprising:
   an application processor (AP) configured to execute a protocol stack, including at least one of: a session setup protocol, a media carrier protocol, a transport protocol, and an Internet Protocol (IP) of an IP stack; and
   a processor, located outside of the AP, configured to implement an audio sniffer module,
   wherein the audio sniffer module is configured to receive a first IP packet and to determine whether or not the first IP packet contains a first audio frame, the audio sniffer module further configured, if the first IP packet does not contain the first audio frame, to forward the first IP packet to the AP, and, if the first IP packet contains the first audio frame, to extract the first audio frame from the first IP packet and to forward the first audio frame to an audio processor, and
   wherein the audio sniffer module is further configured to receive a second audio frame from the audio processor; encapsulate the second audio frame in a first transport protocol packet and insert a predefined transport protocol port number; encapsulate the first transport protocol packet in a second IP packet and insert a predetermined destination IP address; and forward the second IP packet to a transmitter module of the wireless communications device.

2. The wireless communications device of claim 1, wherein the audio sniffer module comprises:
   an IP filter configured to examine the first IP packet to determine a first condition of whether a source IP address of the first IP packet matches a predetermined source IP address; a second condition of whether the first IP packet encapsulates a second transport protocol packet of a defined type; and when the first IP packet encapsulates the second transport protocol packet of the defined type, a third condition of whether a destination port number of the second transport protocol packet matches a predetermined transport protocol port number.

3. The wireless communications device of claim 2, wherein the protocol stack executing on the AP includes the session setup protocol, and wherein the IP filter receives at least one of the predetermined source IP address and the predefined transport protocol port number from the session setup protocol executing on the AP.

4. The wireless communications device of claim 2, wherein the defined type is User Datagram Protocol (UDP).

5. The wireless communications device of claim 2, wherein the audio sniffer module further comprises;
a thin IP/transport protocol module; and
a media carrier protocol module.

6. The wireless communications device of claim 5, wherein the IP filter is further configured, if the first IP packet does not satisfy at least one of the first, second, and third conditions, to forward the first IP packet to the AP, and, if the first IP packet satisfies all of the first, second, and third conditions, to forward the first IP packet to the thin IP/transport protocol module.

7. The wireless communications device of claim 6, wherein the first IP packet satisfies all of the first, second, and third conditions, and wherein the thin IP/transport protocol module is configured to process an IP header and a transport protocol header of the first IP packet to extract a media carrier protocol packet from the first IP packet and to forward the media carrier protocol packet to the media carrier protocol module.

8. The wireless communications device of claim 7, wherein the media carrier protocol module is configured to process the media carrier protocol packet to extract the first audio frame and to forward the first audio frame to the audio processor.

9. The wireless communications device of claim 5, wherein the media carrier protocol module is configured to receive the second audio frame from the audio processor, to encapsulate the second audio frame in a media carrier protocol packet, and to forward the media carrier protocol packet to the thin IP/transport module.

10. The wireless communications device of claim 9, wherein the thin IP/transport protocol module is configured to encapsulate the media carrier protocol packet in the first transport protocol packet, to encapsulate the first transport protocol packet in the second IP packet, and to forward the second IP packet to the transmitter module.

11. The wireless communications device of claim 10, wherein the protocol stack executing on the AP includes the session setup protocol, wherein the thin IP/transport protocol module receives the predefined transport protocol port number and the predetermined destination IP address from the session setup protocol, and wherein the thin IP/transport protocol module inserts the predefined transport protocol port number into the first transport protocol packet and the predetermined destination IP address into the second IP packet.

12. The wireless communications device of claim 1, wherein the processor is located inside one of a wireless modem and a WiFi™ chip of the wireless communications device.

13. The wireless communications device of claim 1, wherein the processor is integrated on a same chip as a wireless modem of the wireless communications device.

14. The wireless communications device of claim 1, wherein the session setup protocol includes the Session Initiation Protocol (SIP), wherein the media carrier protocol includes the Real-time Transport Protocol (RTP), and wherein the transport protocol includes the User Datagram Protocol (UDP) or the Transmission Control Protocol (TCP).

15. A method for processing packets in a wireless communications device, comprising:
receiving a first IP packet;
determining whether or not the first IP packet contains a first audio frame;
if the first IP packet does not contain the first audio frame, forwarding the first IP packet to an application processor (AP) of the wireless communications device;
if the first IP packet contains the first audio frame, extracting the first audio frame from the first IP packet and forwarding the first audio frame to an audio processor of the wireless communications device;
receiving a second audio frame from the audio processor;
encapsulating the second audio frame in a first transport protocol packet, including inserting a predefined transport protocol port number;
encapsulating the first transport protocol packet in a second IP packet, including inserting a predetermined destination IP address; and
forwarding the second IP packet to a transmitter module of the wireless communications device.

16. The method of claim 15, wherein determining whether or not the first packet contains the first audio frame comprises:
examining the first IP packet to determine a first condition of whether a source IP address of the first IP packet matches a predetermined source IP address; a second condition of whether the first IP packet encapsulates a second transport protocol packet of a defined type; and when the first IP packet encapsulates the second transport protocol packet of the defined type, third condition of whether a destination port number of the second transport protocol packet matches a predetermined transport protocol port number.

17. The method of claim 15, wherein at least one of the predetermined source IP address and the predefined transport protocol port number are provided by a session setup protocol executing on the AP.

18. The method of claim 15, wherein the method is performed by a processor located inside a wireless modem of the wireless communications device or integrated on a same chip as the wireless modem of the wireless communications device.

19. A wireless communications device, comprising:
an application processor (AP); and
a processor, located outside of the AP, configured to implement an audio sniffer module,
wherein the audio sniffer module is configured to receive a Layer 2 (L2) packet and to determine whether or not the L2 packet contains an audio frame by inspecting a radio bearer of the L2 packet, the audio sniffer module further configured, if the L2 packet does not contain the audio frame, to forward the L2 packet to the AP, and, if the L2 packet contains the audio frame, to extract the audio frame from the L2 packet and to forward the audio frame to an audio processor of the wireless communications device.

20. The wireless communications device of claim 19, wherein the audio sniffer module is configured to receive radio bearer information that indicates radio bearers assigned to established audio sessions and to compare the radio bearer of the L2 packets to the assigned radio bearers.

* * * * *

UNITED STATES PATENT AND TRADEMARK OFFICE
CERTIFICATE OF CORRECTION

PATENT NO. : 8,787,381 B2
APPLICATION NO. : 13/478955
DATED : July 22, 2014
INVENTOR(S) : Medapalli et al.

Page 1 of 1

It is certified that error appears in the above-identified patent and that said Letters Patent is hereby corrected as shown below:

In the Claims:

Column 14, line 47, please replace "a wireless modern" with --a wireless modem--.

Signed and Sealed this
Fourteenth Day of October, 2014

Michelle K. Lee
*Deputy Director of the United States Patent and Trademark Office*